(12) United States Patent
Lee

(10) Patent No.: US 8,703,361 B2
(45) Date of Patent: Apr. 22, 2014

(54) MEMBRANE ELECTRODE ASSEMBLY AND METHODS FOR MAKING SAME USING RELEASE PAPER AND AN INCISION PART

(75) Inventor: Ki Sub Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 475 days.

(21) Appl. No.: 12/847,012

(22) Filed: Jul. 30, 2010

(65) Prior Publication Data

US 2011/0136039 A1    Jun. 9, 2011

(30) Foreign Application Priority Data

Dec. 3, 2009    (KR) .................. 10-2009-0119364

(51) Int. Cl.
  *H01M 8/00* (2006.01)
  *H01M 4/88* (2006.01)
  *H01M 8/02* (2006.01)

(52) U.S. Cl.
  CPC .......... *H01M 4/8857* (2013.01); *H01M 8/0286* (2013.01)
  USPC ........... 429/535; 429/523; 429/516; 429/507; 502/439

(58) Field of Classification Search
  CPC .... H01M 4/8857; H01M 8/00; H01M 8/0286
  USPC .................. 429/535, 523, 516, 507; 502/439
  See application file for complete search history.

(56) References Cited

U.S. PATENT DOCUMENTS

2003/0191021 A1* 10/2003 Ripley et al. .................. 502/439
2004/0241525 A1* 12/2004 Mekala et al. .................. 429/36

* cited by examiner

*Primary Examiner* — Zachary Best
(74) *Attorney, Agent, or Firm* — Edwards Wildman Palmer LLP; Peter F. Corless

(57) ABSTRACT

A membrane electrode assembly manufacturing method that includes: (a) forming a first electrode on a first release paper and a second electrode on a second release paper corresponding to the first electrode; (b) forming first incision parts in the first release paper at a predetermined interval along the first electrode's edge and second incision parts in the second release paper at a predetermined interval along the second electrode's edge; (c) adhering a first release paper surface on which the first electrode is formed on one electrolyte membrane surface and adhering one second release paper surface in which the second electrode is formed on the other electrolyte membrane surface; and (d) removing one part of the first release paper corresponding to the first electrode along the first incision part and removing one part of the second release paper corresponding to the second electrode along the second incision part.

11 Claims, 3 Drawing Sheets

MEMBRANE ELECTRODE ASSEMBLY AND METHODS FOR MAKING SAME USING RELEASE PAPER AND AN INCISION PART

CROSS-REFERENCE TO RELATED APPLICATION

This application claims priority to and the benefit of Korean Patent Application No. 10-2009-0119364 filed in the Korean Intellectual Property Office on Dec. 3, 2009, the entire contents of which are incorporated herein by reference.

BACKGROUND OF THE INVENTION (a) Field of the Invention

The present invention generally relates to a membrane electrode assembly and more particularly relates to a manufacturing method of a membrane electrode assembly that is provided in a fuel cell system to transform chemical energy to electrical energy.

(b) Description of the Related Art

As is known to those skilled in the art, a fuel electric stack is a solid high-molecule electrolyte type of fuel cell (PEMC: proton exchange membrane fuel cell). Such a fuel cell is presently used for a vehicle.

In the solid high-molecule electrolyte type of fuel cell, hydrogen is supplied to an anode (fuel electrode) and oxygen is supplied to a cathode (air electrode).

The hydrogen ions (H+) supplied to the anode pass through an electrolyte membrane as a positive ion exchange membrane to be selectively transferred to the cathode through a catalyst of an electrode layer formed at both sides of the electrolyte membrane. Simultaneously electrons are transferred to the cathode through a conductive gas diffusion layer and a separating plate.

In the cathode, the hydrogen ions supplied through the electrolyte membrane and the electrons supplied through the separating plate react with oxygen from the air supplied to the cathode by an air supply device and generate water.

A current also is generated by the flow of electrons derived from hydrogen ions through a wire. Also, heat is collaterally generated from the water formation reaction.

In the fuel cell system, a stack generating electricity has a structure in which several or dozens of unit cells are laminated, each unit including a membrane electrode assembly and a separating plate.

Conventional manufacturing methods for a membrane electrode assembly (MEA) includes a direct coating method where an electrode is coated or applied onto an electrolyte membrane, and a decal method where an electrode is coated or applied onto a release paper and then printing the electrode onto an electrolyte membrane.

In such a decal method, an electrode slurry is coated on the release paper to reduce transformation of the electrolyte membrane by the slurry solvent. This method is advantageous in that a roller or plane plate press is usable to manufacture the MEA in the decal method.

In such a decal method or process a sub-gasket is joined to the MEA such as by means of a roller. However, in such a process where a roller is used to join the sub-gasket to the MEA, it is difficult to sustain tension of the membrane that is being used for the sub-gasket. It also is not uncommon to see a wrinkle be formed in the membrane during the joining process. In addition, the manufacturing process is complicated such that the cost thereof is increased as compared to other methods.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention features a membrane electrode assembly and a manufacturing method for such an assembly. Such methods are advantageous because of the simplifying of the manufacturing process and reducing manufacturing costs.

In particular aspects/embodiments of the present invention, such a membrane electrode assembly manufacturing method includes an electrode forming step for forming a first electrode on a first release paper and forming a second electrode corresponding to the first electrode on a second release paper corresponding to the first release paper and an incision part forming step for forming first incision parts with a predetermined length in the first release paper at predetermined intervals along the edge of the first electrode and second incision parts with a predetermined length in the second release paper at predetermined intervals along the edge of the second electrode. Such methods also include an adhesion step for adhering one side surface of the first release paper on which the first electrode is formed on one side surface of an electrolyte membrane and one side surface of the second release paper on which the second electrode is formed on the other side surface of the electrolyte membrane; and a removing step for removing one part of the first release paper corresponding to the first electrode along the first incision part and removing one part of the second release paper corresponding to the second electrode along the second incision part.

In further embodiments, an adhesive is coated on the surface of the first release paper or the second release paper except for the surface corresponding to the first electrode or the second electrode.

In yet further embodiments, the length of the first incision part or the second incision part is longer than the interval between them.

In yet further embodiments, the first electrodes are disposed with a predetermined interval on the first release paper, and the second electrodes are disposed with a predetermined interval on the second release paper.

In yet further embodiments, the first release paper or the second release paper is adhered to one side surface or the other side surface of the electrolyte membrane at a predetermined high temperature and a predetermined high pressure in the adhesion step.

In yet further embodiments, a projecting part of a shape corresponding to the first electrode is formed on an outside surface of the first release paper, and a projecting part of a shape corresponding to the second electrode is formed on an outside surface of the second release paper.

In yet further embodiments, one part of the first release paper and one part the second release paper is removable in such a manner that one side surface of the first electrode and one side surface of the second electrode are exposed to the outside in the removing step. Also, the exposed surface of the first electrode and the outside surface of the first release paper are on one plane, and the exposed surface of the second electrode and the outside surface of the second release paper are on another plane.

In yet further aspects/embodiments of the present invention, the membrane electrode assembly is manufactured according to the manufacturing method of the present invention as herein described.

In a membrane electrode assembly manufacturing method as described herein, when joining an electrode to an electrolyte membrane, a part of the release paper is selectively removed while a remaining portion of the release paper remains. Thus, is such a process of the present invention, the conventional process of forming a separate sub-gasket is omitted. Accordingly, by eliminating the need to separately provide in the manufacturing process a step of forming a sub-gasket, in the manufacturing method of the present invention should see reduced manufacturing cost is reduced and the saving of related material as compared to a conventional decal method.

Other aspects and embodiments of the present invention are described herein.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

Figure 1:
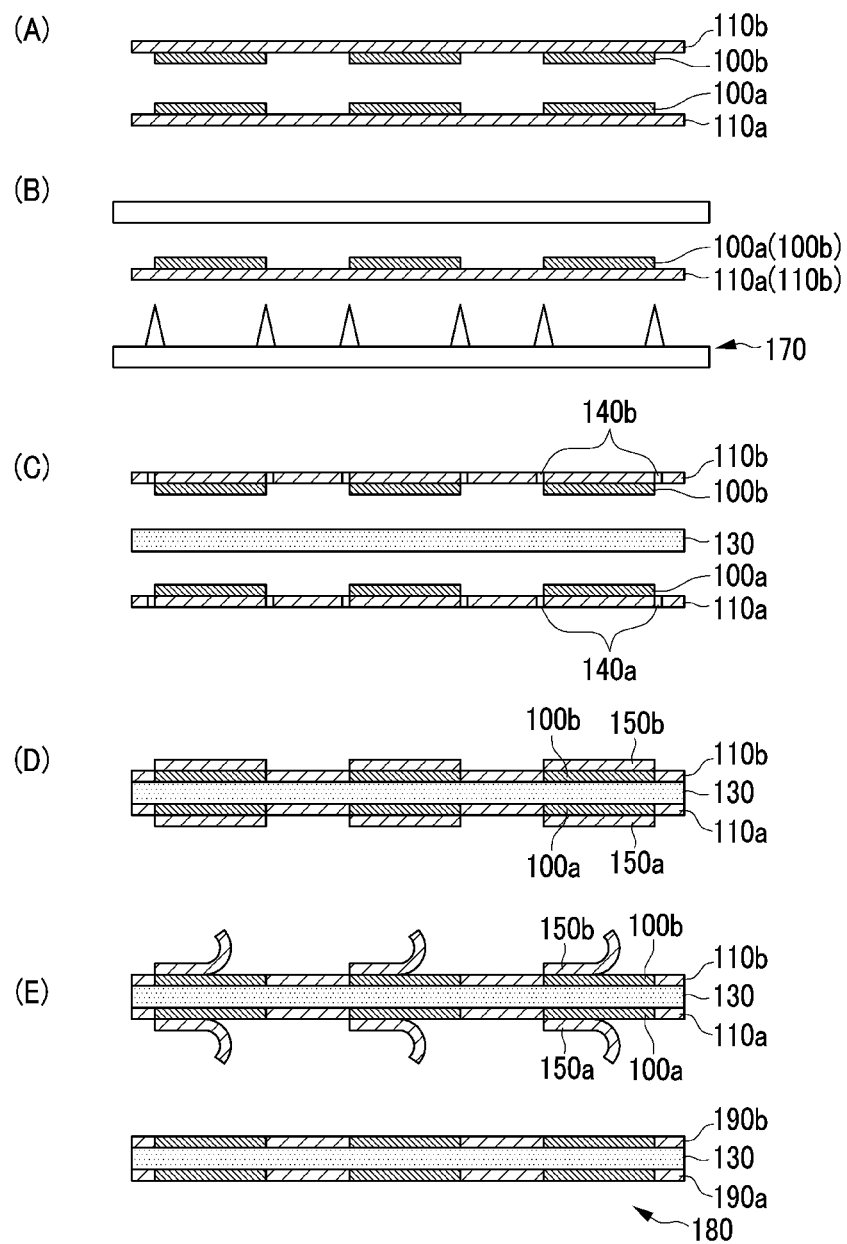
FIGS. 1(A)-(E) are respective side views of a schematic view showing a membrane electrode assembly manufacturing method according to the present invention.

Reference numerals set forth in the Drawings include reference to the following elements as further discussed herein.
  100$a$: first electrode
  100$b$: second electrode
  110$a$: first release paper
  110$b$: second release paper
  130: electrolyte membrane
  140$a$: first incision part
  140$b$: second incision part
  150$a$: first projecting part
  150$b$: second projecting part
  170: incision device
  180: membrane electrode assembly
  190$a,b$: sub gasket

DETAILED DESCRIPTION OF THE EMBODIMENTS

In aspects/embodiments of the present invention there is featured a manufacturing method for making a membrane electrode assembly (MEA) as well as a membrane electrode assembly made using the manufacturing methods. Such a manufacturing method includes an electrode forming step for forming: (a) a first electrode on a first release paper, and (b) a second electrode corresponding to the first electrode on a second release paper corresponding to the first release paper. Such a method also includes an incision part forming step for forming: (a) first incision parts in the first release paper at a predetermined interval along the edge of the first electrode, each first incision part having a predetermined length and (b) second incision parts in the second release paper with a predetermined interval along the edge of the second electrode, each second incision part having a predetermined length.

In further embodiments, such a manufacturing method includes applying the first and second release papers to an electrolyte membrane. The first and second release papers are applied in such a way that that portions of the first and second release papers corresponding to respective first and second electrodes are displaced from the electrolyte membrane. In yet further embodiments, during such applying the other portions of the first release paper and the other portions of the second release papers are disposed proximal to a respective one of the two opposing surfaces of the electrolyte membrane.

In yet further embodiments, such methods further include providing an electrolyte membrane and adhering one side surface of the first release paper in which the first electrode is formed on one side surface of an electrolyte membrane and one side surface of the second release paper in which the second electrode is formed on the other side surface of the electrolyte membrane.

In further embodiments, such methods further include removing at least one portion of the first release paper corresponding to the first electrode along the first incision part and removing at least one portion of the second release paper corresponding to the second electrode along the second incision part.

In yet further embodiments, such methods further include a removing step for removing each portion of the first release paper corresponding to the first electrode along the first incision part and removing each portion of the second release paper corresponding to the second electrode along the second incision part.

In yet further embodiments in such methods the length of at least one of each first incision part or each second incision part is longer than the interval between the respective parts.

Referring now to FIGS. 1(A)-(E) and FIGS. 2(A)-(E), there is shown respective side views of a schematic view showing a membrane electrode assembly manufacturing method according to the present invention [FIGS. 1(A)-(E)] and respective perspective views of a schematic view also showing a membrane electrode assembly manufacturing method according to the present invention [FIGS. 2(A)-(E)].

Figure 2:
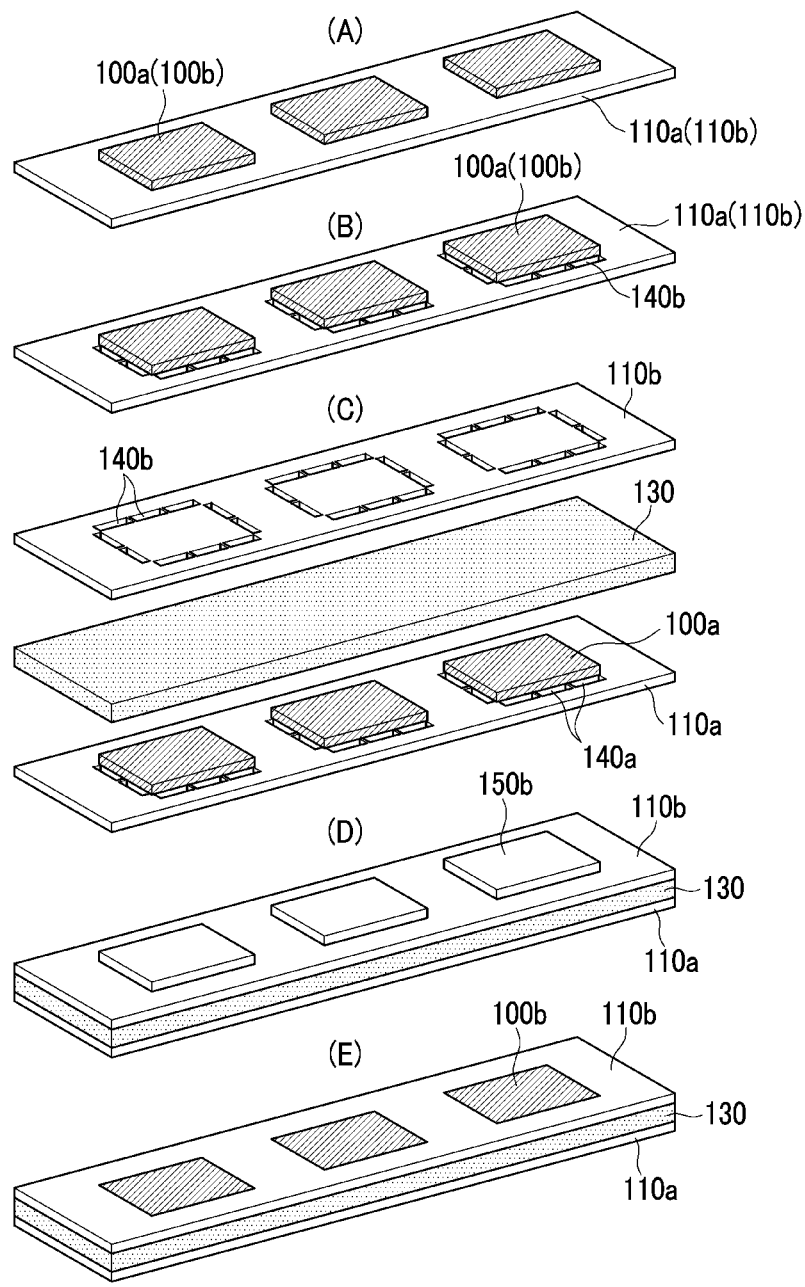
FIGS. 2(A)-(E) are respective perspective views of a schematic view also showing a membrane electrode assembly manufacturing method according to the present invention.

As shown in FIG. 1(A) and FIG. 2(A) electrodes are formed on the release papers 110$a$ and 110$b$ at predetermined intervals. The release papers 110$a$ and 110$b$ are divided into a first release paper 110$a$ on which a first electrode (e.g., an anode) is formed, and a second release paper 110$b$ on which a second electrode (e.g., a cathode) are respectively formed.

In further embodiments, an layer of 1 to 2 μm can be coated on one part of the release papers 110$a,b$ excluding a part corresponding to electrodes 100$a,b$.

Referring to FIG. 1(B) and FIG. 2(B), first incision parts 140$a$ are formed in the first release paper 110$a$ where the first electrodes 110$a$ are formed, second incision parts 140$b$ are formed in the second release paper 110$b$ where the second electrodes 110$b$ are formed, and the first incision parts 140$a$ and the second incision parts 140$b$ are formed along the edges of the first electrodes 100$a$ and the second electrodes 100$b$.

As shown in more clearly in FIG. 1(B), and incision device 170 is positioned proximal the respective first and second release papers and such that the incision device 170 forms the incision parts 140$a$ and 140$b$. In particular embodiments, the length of the incision parts 140$a$ and 140$b$ and an interval therebetween have a predetermined value or ratio. In yet more particular embodiments, the first and second incision parts 140$a$ and 140$b$ have a length of about 5 mm, and the interval therebetween is about 0.5 mm.

The length of a part or portion of the first and second release papers where the incision parts are not formed between the first and second incision parts preferably is shorter than the length of the first and second incision parts, such as shown in FIGS. 2(B) and 2(C). In yet further embodiments, it is preferable that the width of the first and second incision parts is narrow so that the incision parts form a slot or rectangular like opening or incision in the release papers.

As also shown, the first incision parts 140a are formed along an edge of the first electrodes in the first release paper 110a, and the second incision parts 140b are formed along the edge of the second electrodes 100b in the second release paper 110b.

Referring now to FIG. 1 (C) and FIG. 2(C), an electrolyte membrane 130 is formed between the first release paper 110a, more particularly the side or surface where the first electrodes 110a are formed, and the second release paper 110b, more particularly the side or surface where the second electrodes 110b are formed.

In more particular embodiments, the first electrodes 110a are formed on the upper side of the first release paper 110a that is positioned below the lower surface of the electrolyte membrane 130, and the second electrodes 100b are formed on the lower side of the second release paper 110b that is positioned above the upper surface of the electrolyte membrane 130.

Referring now more particularly to FIG. 1(D) and FIG. 2(D), the first release paper 110a and the second release paper 110b are attached to the electrolyte membrane 130. In more particular embodiments, the first and second release papers are pressed by a roller at a predetermined high temperature and with a predetermined force.

As also shown, parts of the first release paper 110a corresponding to the first electrodes 100a protrude downward to form first projecting parts 150a, and parts of the second release paper 110b corresponding to the second electrodes 100b protrude upward to form second projecting parts 150b. In other words, these parts of the release paper are displaced from the electrolyte membrane 130 as compared to other parts or portions of the release papers which are proximal to or essentially abut the electrolyte membrane.

As shown in FIGS. 1(C)-(D) and FIGS. 2(C)-(D) in further embodiments, the first incision parts 140a are formed along the boundary of the first projecting parts 150a of the first release paper 110a corresponding to the first electrodes 100a. It also is preferable that the first release paper 110a is divided along the incision parts 140a. In further embodiments, the second incision parts 140b are formed along the boundary of the second projecting parts 150b of the second release paper 110b corresponding to the second electrodes 100b. Also, it is preferable that the second release paper 110b is divided along the second incision parts 140b.

As the length of the first and second incision parts 140a and 140b is about 5 mm and the interval between them is about 0.5 mm, the first projecting parts 150a are separated from the first release paper 110a.

Referring now to FIG. 1(E) and FIG. 2(E), in yet further embodiments the first release paper 110a and the first electrodes 100a are attached to the lower surface of the electrolyte membrane 130, and the second release paper 110b and the second electrodes 100b are attached to the upper surface of the electrolyte membrane 130. In yet further embodiments, the first projecting parts 150a of the first release paper 110a corresponding to the first electrodes 100a are separated from the first release paper 110a, and the second projecting parts 150b of the second release paper 110b corresponding to the second electrodes 100b are separated from the second release paper 110b.

Referring now to FIG. 1(E) and FIG. 2(E), the first projecting parts 150a of the first release paper 110a are separated from the first electrodes 100a along the first incision parts 140a thereof, and the second projecting parts 150b of the second release paper 110b are separated from the second electrodes 100b along the second incision parts 140b thereof.

In such an arrangement, the upper surface of the first electrodes 100a adheres to the lower surface of the electrolyte membrane 130, and the lower surface of the first electrodes 100a is positioned at the same level as the lower surface of the first release paper 110a.

Further, the lower surface of the second electrodes 100b adheres to the upper surface of the electrolyte membrane 130, and the upper surface of the second electrodes 100b is positioned at the same level as the upper surface of the second release paper 110b. Accordingly, the upper surface and the lower surface of an electrode membrane assembly 180 are flat. As indicated herein, in particular embodiments, such adherence is achieved by an adhesive.

In the manufacturing method according to the present invention, it is not necessary to form separate sub-gaskets along an edge of the electrode membrane assembly 180, as the portions 190a,b respectively of the first release paper 110a and the second release paper 110b remaining after the first and second projecting parts are removed in effect function as sub-gaskets.

As described herein, in conventional manufacturing methods or techniques, when the first electrodes and the second electrodes are attached to the electrolyte membrane and the first release paper and the second release paper are removed, a process for forming separate sub-gaskets is necessary. However, in the present invention, a part of each of the first release paper 110a and the second release paper 110b is incised to be removed and a part thereof remains, such that a manufacturing process for forming sub-gaskets is not necessary.

Figure 3:
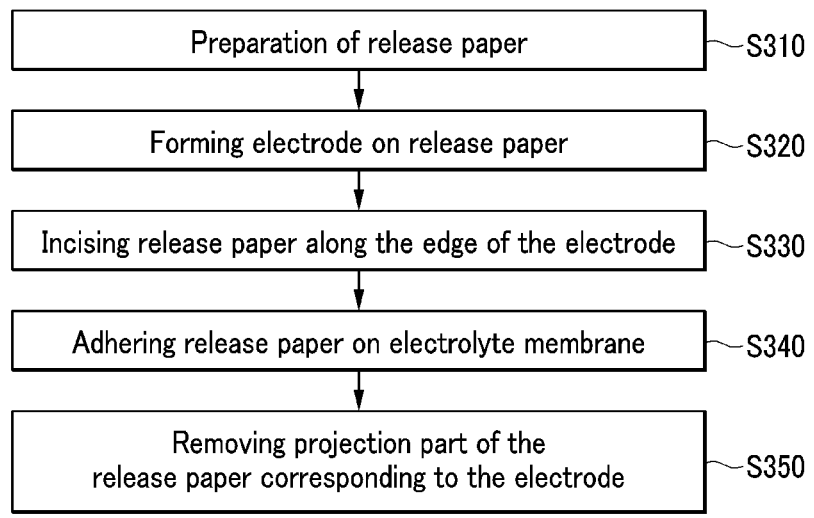
FIG. 3 is a high level flowchart or flow diagram of a membrane electrode assembly manufacturing method according to the present invention.

Referring now to FIG. 3 there is shown a high level flowchart or flow diagram of a membrane electrode assembly manufacturing method according to the present invention. Such a manufacturing method of a membrane electrode assembly according to an exemplary embodiment of the present invention includes a first step S310, a second step S320, a third step S330, a fourth step S340, and a fifth step S350.

In the first step S310, the first release paper 110a and the second release paper 110b are prepared such as described herein. In the second step S320, the first electrodes 100a and the second electrodes 100b are formed on the first release paper 110a and the second release paper 110b, respectively.

The third step S330 is a punching or incision process, in which the first incision parts 140a are formed along the edges of the first electrodes 100a at predetermined intervals in the first release paper 110a and the second incision parts 140b are formed along the edges of the second electrodes 100b at predetermined intervals in the second release paper 110b.

In the fourth step S340, the first release paper 110a on which the first electrodes 100a are formed and the second release paper 110b on which the second electrodes 100b are formed are respectively attached to the lower surface and the upper surface respectively of the electrolyte membrane 130. As described herein, such attachment results in portions of the first and second release papers to be displaced outwardly from the electrolyte membrane so as to thereby create projecting parts 150a, b respectively of the first and second release papers.

In the fifth step S350, the first and second projecting parts 150a, 150b respectively of the first release paper 110a and the second release paper 110b are removed such that the lower surface of the first electrodes 100a and the upper surface of the second electrodes 100b are exposed outwards. Also, in such an arrangement, the exposed lower surface of the first electrodes 100a and the outside surface of the first release paper 110a are positioned on the same plane and the exposed upper surface of the second electrodes 100b and the outside surface of the second release paper 110b are positioned on the same plane.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane electrode assembly manufacturing method, comprising:
    an electrode forming step for forming a first electrode on a first release paper, and forming a second electrode corresponding to the first electrode on a second release paper corresponding to the first release paper;
    an incision part forming step for forming first incision parts with a predetermined length in the first release paper at a predetermined interval along the edge of the first electrode formed on the first release paper and second incision parts at a predetermined length in the second release paper with a predetermined interval along the edge of the second electrode formed on the second release paper;
    in response to forming the first incision parts and second incision parts, performing an adhesion step for adhering the first and second release papers formed with the first and second incision parts respectively on first and second side surfaces of an electrolyte membrane, wherein the first and second electrodes respectively face the electrolyte membrane, the first release paper excluding a first electrode area covering the first electrode is adhered to the first side of the electrolyte membrane, and the second release paper excluding a second electrode area covering the second electrode is adhered to the second side the electrolyte membrane; and
    a removing step for removing the first electrode area of the first release paper covering the first electrode along the first incision part and removing the second electrode area of the second release paper covering the second electrode along the second incision part wherein the first and second release papers excluding the first and second electrode areas remain adhered to the electrolyte membrane,
    wherein the portion of the first and second release paper that retains act as a sub-gasket.

2. The membrane electrode assembly manufacturing method of claim 1, wherein an adhesive is coated on the surface of the first release paper or the second release paper except for the surface corresponding to the first electrode or the second electrode.

3. The membrane electrode assembly manufacturing method of claim 1, wherein the length of the first incision part or the second incision part is longer than the interval between the first incision parts and the second incision parts.

4. The membrane electrode assembly manufacturing method of claim 1, wherein the first electrodes are disposed at a predetermined interval on the first release paper and the second electrodes are disposed at a predetermined interval on the second release paper.

5. The membrane electrode assembly manufacturing method of claim 1, wherein the first release paper or the second release paper is adhered to one side surface or the other side surface of the electrolyte membrane at a predetermined temperature and a predetermined pressure in the adhesion step.

6. The membrane electrode assembly manufacturing method of claim 1, wherein a projecting part of a shape corresponding to the first electrode is formed on an outside surface of the first release paper and a projecting part of a shape corresponding to the second electrode is formed on an outside surface of the second release paper.

7. The membrane electrode assembly manufacturing method of claim 1, wherein the first release paper and the second release paper are removed so that one side surface of the first electrode and one side surface of the second electrode are exposed in the removing step, the exposed surface of the first electrode and the outside surface of the first release paper are on the same plane, and the exposed surface of the second electrode and the outside surface of the second release paper are on another plane.

8. A membrane electrode assembly that is manufactured according to claim 1.

9. A membrane electrode assembly manufacturing method, comprising:
    an electrode forming step for forming: (a) a first electrode on a first release paper, and (b) a second electrode corresponding to the first electrode on a second release paper corresponding to the first release paper;
    an incision part forming step for forming: (a) first incision parts in the first release paper at a predetermined interval along the edge of the first electrode formed on the first release paper, each first incision part having a predetermined length and (b) second incision parts in the second release paper with a predetermined interval along the edge of the second electrode formed on the second release paper, each second incision part having a predetermined length;
    in response to forming the first incision parts and second incision parts, performing an adhesion step for adhering the first and second release papers formed with the first and second incision parts respectively on first and second side surfaces of an electrolyte membrane, wherein the first and second electrodes respectively face the electrolyte membrane, the first release paper excluding a first electrode area covering the first electrode is adhered to the first side of the electrolyte membrane, and the second release paper excluding a second electrode area covering the second electrode is adhered to the second side the electrolyte membrane; and
    a removing step for removing the first electrode area of the first release paper covering the first electrode along the first incision part and removing the second electrode area of the second release paper covering the second electrode along the second incision part wherein the first and second release papers excluding the first and second electrode areas remain adhered to the electrolyte membrane,
    wherein the portion of the first and second release paper that retains act as a sub-gasket.

10. The membrane electrode assembly manufacturing method of claim 9, further comprising the step(s):
    applying said first and second release papers to an electrolyte membrane such that portions of the first and second release papers corresponding to respective first and second electrodes are displaced from the electrolyte membrane.

11. The membrane electrode assembly manufacturing method of claim 9, wherein the length of at least one of each first incision part or each second incision part is longer than the interval between the respective parts.

\* \* \* \* \*